2,942,980
Patented June 28, 1960

2,942,980

FOAMING MALT BEVERAGES

Edward Segel and Edwin J. Wye, Chicago, Ill., assignors to J. E. Siebel Sons' Company, Inc., Chicago, Ill., a corporation of Illinois No Drawing. Filed May 20, 1959, Ser. No. 814,401

4 Claims. (Cl. 99—48)

This invention relates to improvement of foam in carbonated alcoholic beverages derived from malt.

More specifically, it relates to the improvement of foam in beverages such as beer, ale, and so-called "near beer." In the present specification, the word "beer" is used to include the entire class of carbonated fermented malt beverages.

The quality of beer foam and the rate at which it collapses depend both on the beer itself and on how it is poured. If different beers are poured under exactly the same conditions, it will in general be found that their foams collapse at different rates.

The reason why the foams of different beers collapse at different rates is not completely understood. The size of the gas bubble is recognized as an important factor in foam life, as discussed by de Clerck and de Dycker in Proceedings of the European Brewery Convention, Copenhagen, pp. 43–50 (1957). A material which could be added to beer to reduce bubble size would be desirable, both to increase foam life and to make a more "creamy" foam.

Variation in foam life is found not only among different brands of beer, but in different batches of beer made by the same brewery. One of the aims of a brewery is to produce consistently a beer which gives a long-lasting head of foam. This goal is not easy to attain.

Detergents may have a harmful effect on beer foam, shortening foam life substantially. Since traces of detergents may be introduced inadvertently into beer, either as a residue from cleaning procedures in the brewery, or by incomplete rinsing of glasses used by the consumer, a material which would inhibit this harmful effect of detergents is highly desirable.

An object of this invention is to decrease bubble size and increase foam life in any carbonated malt beverage.

Another object of this invention is to produce a beer more pleasing to the consumer, in that the head of foam formed when the beer is poured into a glass is creamier and collapses more slowly.

Another object is to produce a beer whose foam life is resistant to the deleterious effect of detergents.

Another object is to produce carbonated fermented malt beverages with the aforesaid advantages without impairment of gas release rate and free flowability on pouring.

Another object is to produce beverages as aforesaid without impairment of filtrability in manufacture.

Other objects of this invention will appear hereinafter.

We have discovered that high molecular weight polymers of ethylene oxide have a remarkable effect on beer foam. By "high molecular weight polymers of ethylene oxide" or more simply "polyethylene oxide" we mean commercial polymerizate of ethylene oxide in the approximate molecular weight range of from about two hundred thousand to over six million. These have a viscosity in the range from about 200 centipoises at 5% by weight concentration in water at 25° C. to about 7000 centipoises at 1% concentration, as measured by Brookfield viscometer RVF at 2 r.p.m. and largest spindle for desired scale.

The addition of polyethylene oxide to beer markedly lowers the bubble size, increases creaminess, and increases the time which elapses between pouring the beverage into a glass and the disappearance of the foam so formed.

To determine the increase in foam life of beer produced by polyethylene oxide, the rate of collapse of the head of foam on a glass of beer is measured under standardized conditions. Reproducible results are obtainable by control over the distance through which the beer falls when poured, the time required for pouring a standard volume, and the temperature of the beer when poured.

A further advantage of polyethylene oxide is that it inhibits the deleterious effect detergents may have on beer foam. Thus, while the foam of untreated beer is made markedly worse by such detergents as, for example, "Dreft," cetyl trimethyl ammonium bromide, or polyoxyethylene sorbitan monooleate ("Tween 80," manufactured by Atlas Powder Co.), a beer containing polyethylene oxide is not so affected.

High molecular weight polyethylene oxide is made by polymerization of ethylene oxide, as for example by heating in the presence of alkaline earth carbonate catalysts, as described in Industrial and Engineering Chemistry, vol. 50, pp. 5–7, 1958.

This polymer material is water soluble. However, it has been found that the introduction of this polymer material into beer, without modification, either as an aqueous solution or by dissolving it directly in the beverage during manufacturing, can lead to some other problems in the subsequent manufacture of the beer, and to certain disadvantages in the quality of the resulting beer.

The effect of polyethylene oxide on beer foam is strikingly consistent. The degree of increase in foam life will in part depend on the polymer grade and its concentration, as well as to some extent on the particular beer or other beverage used. In a very general way, the higher the molecular weight of the polymer used, the greater is the increase in foam life.

Use of such a high molecular weight polymer of ethylene oxide does not impair the stability, taste, or brilliance of the beverage in which it is used.

For most purposes, the desired concentration of high molecular weight ethylene oxide polymer lies in the range of 40–160 parts per million. For special purposes, lower, such as about 20 p.p.m., or higher concentrations, such as up to about 320 p.p.m., may be desirable.

Before beer is packaged, it is subjected to a so-called polishing filtration, to give a sparkling, perfectly clear beverage. This filtration is an essential step in beer production, and the cost of such filtration is part of the production cost of beer. Breweries maintain sufficient filter capacity to satisfy their production requirements. If the rate of beer filtration through a given filter is reduced for any reason, greater filter capacity is required for the same volume of beer production. Greater filter capacity would necessitate greater capital investment and consequent increased production costs.

It has been found that if solid polyethylene oxide in unmodified commercially produced condition is allowed to dissolve in beer, or if an aqueous solution of such polyethylene oxide is first prepared, and then added to beer in the amounts previously described, the resulting beer filters more slowly than similar beer not so treated with polyethylene oxide.

This adverse effect on filtration rate is most pronounced with the polyethylene oxide grades of highest molecular weight, which are the grades most efficacious in increasing foam collapse time.

Beer treated with such polyethylene oxide can exhibit other undesirable characteristics, such as the tendency to release its gas slowly, giving the foam a "dead" character, and a "dead" and "ropy" character when poured. These characteristics are most pronounced with the higher molecular weight grades of polyethylene oxide.

It would obviously be highly useful to find a way to eliminate such undesirable characteristics of polyethylene oxide treated beer and still retain the desired increase in foam collapse time. The present invention describes a simple, totally unexpected way of accomplishing such result.

Although we have found, for example, that the higher molecular weight grades of polyethylene oxide, which have greater viscosity, impart a greater increase to beer foam life than lower molecular weight grades, which are less viscous, and while it is convenient to describe polyethylene oxide grades by their viscosities, it is to be understood that no casual relationship between viscosity and effect on foam collapse has been established. At the same time, the higher molecular weight grades of polyethylene oxides, which have the greatest viscosity and the greatest effect on increasing the foam collapse time of beer, also are most pronounced in imparting the aforesaid concomitant undesirable characteristics to beer.

It is known that the viscosity of polyethylene oxide solutions is decreased if high shearing forces are used in preparation of its solutions, and for such reason it was heretofore considered that violent or very high speed agitation should be avoided in their preparation.

We have discovered that mechanical working and the application of high shearing forces to polyethylene oxide give rise to a physically-chemically modified composition of matter, which we call sheared ethylene oxide polymerizate, which has new and unexpected properties in combination with beer.

If high molecular weight polyethylene oxide is subjected to high shearing action for even a very brief time, its viscosity in aqueous solution is markedly reduced. Contrary to expectation, however, the sheared polymer has a more beneficial over-all effect on beer than does either the original unsheared polymer, or a polyethylene oxide made by polymerizing ethylene oxide to such a degree as to possess the same viscosity as the sheared polymer.

To clarify the above, let us consider a specific example.

*Example I*

A 1% aqueous solution of polyethylene oxide was prepared by dissolving a commercial grade of high molecular weight polyethylene oxide in water. The viscosity of this solution as measured by a Brookfield RVF viscometer at 2 r.p.m. was 3200 centipoises; its molecular weight was about 3 million. This solution was added to beer in the cellar prior to polishing filtration so that the concentration of polyethylene oxide was either 20 or 80 p.p.m. The resultant beers filtered slowly, released their gas slowly, and appeared "ropy."

A portion of the 1% polyethylene oxide solution just described was subjected to very high shear by stirring at 15,000 r.p.m. in a Waring Blendor for 15 seconds. The resultant solution of sheared polyethylene oxide had a viscosity of 1500 centipoises. This solution, added to beer at the stage above mentioned so that the sheared polyethylene oxide was at a concentration of 80 p.p.m., behaved completely differently from the original polyethylene oxide. The beer containing the sheared polyethylene oxide filtered satisfactorily, released its gas in a normal manner, and was of normal appearance with no hint of undesirable ropiness.

The foam stabilities of beers treated with either the above described unmodified polyethylene oxide or the sheared polyethylene oxide were substantially equal and each was considerably enhanced over untreated beer.

An unmodified polyethylene oxide with a viscosity, in 1% aqueous solution, of 1500 centipoises (the same viscosity as the above sheared polyethylene oxide), and another unmodified polyethylene oxide in 1% aqueous solution having a viscosity of 1500 centipoises prepared by blending commercial polymerizates having viscosities of 3000 centipoises and 200 centipoises, were each found to be slightly inferior to the sheared polyethylene oxide with the same viscosity with respect to enhancement of beer foam collapse time. More importantly, unlike the beer treated with sheared polyethylene oxide, beers treated with the two 1500 centipoises unmodified polyethylene oxides just described filter poorly, give a "dead" gas release, and are definitely ropy.

From the above example it is evident that polyethylene oxide modified by the action of shearing forces when added to beer behaves quite differently from ordinary polyethylene oxide, with decided advantages, as already described.

While the effect of shearing forces on polyethylene oxide to give a product with different properties can be used to practical advantage without any understanding of the effect of these forces, an hypothesis has been devised to explain this unexpected phenomenon. It must be understood that the correctness of the following hypothesis is untested, and the invention is in no way dependent upon the validity of the hypothesis.

It seems likely that the effect of shearing forces is on the length of the individual molecules comprising polyethylene oxide.

Consider what occurs when ethylene oxide is polymerized to polyethylene oxide. As the polymerization proceeds, chains with the structure $$HOCH_2CH_2(OCH_2CH_2)_nOCH_2CH_2OH$$

($n$=any integer) are built up. The reaction product at any given time consists of molecules of varying chain lengths. Thus if we speak of polyethylene oxide of molecular weight five hundred thousand, we mean that the average molecular weight is five hundred thousand. Most of the molecules will have a molecular weight close to five hundred thousand, but there will be a distribution of molecular weights so that a relatively few of the molecules will have a molecular weight much greater than the average molecular weight and possibly a similar number a much lower molecular weight.

Polyethylene oxide molecules are long linear chains. The greater the molecular weight, the longer the chain length. These chains would tend to intertwine and entangle themselves, most especially those of greatest chain length.

A shearing force applied to polyethylene oxide will meet the most resistance at points of maximum entanglement. Therefore the longest polymer chains would be most likely to suffer rupture, with the consequence that the distribution of molecular weight would be changed, so that the longest chains have been essentially removed and the number of shorter than average chain length increased.

If the above effect of shear on polyethylene oxide is correct, sheared polyethylene oxide differs from the normal polymerizate in the type of molecular weight distribution, sheared polyethylene oxide containing a much lower number of molecules with molecular weights considerably higher than the average molecular weight of the normal material. Thus, although shearing brings about comparatively significant physical-chemical changes in the properties of the ethylene oxide polymerizate and in enhancing its utility for the practice of the present invention, i.e., in combination with fermeted malt beverages, such shearing results in only minor change in the average molecular weight.

Whatever the correctness of the above hypothesis may be, it has been found that by whatever means shearing force is applied to the normal or unmodified polyethylene oxide material, the same profound change in the behavior of the product toward beer takes place. Thus, for example, the shearing force may arise from the action of rapid stirring of a suspension or solution of unmodified polyethylene oxide by means such as a Waring Blendor; from the action of a colloid mill homogenizer on a solution; or from the action of a roller mill or solid polymerizate.

In view of the great difficulty in defining quantitatively the shearing forces in any practical situation, it is convenient to describe the amount of shear in terms of its effect on viscosity. However, it should be emphasized that this effect on viscosity is merely a useful tool in ascertaining the amount of shear which has been applied, and that the change in viscosity is not of the essence of this invention, nor does it result in decreased effectiveness for improving the character and life of foam in fermented malt beverages.

The amount of shear required to effect the desired modification can vary over a rather broad range, and will depend somewhat on the particular polyethylene oxide grade selected for modification.

Comparatively lower molecular weight polyethylene oxide grades, with an average molecular weight below about 700,000, apparently do not contain sufficient very long molecules to require more than a minor amount of shearing force to accomplish the desired result. For such grades, it suffices to apply sufficient shearing force that the viscosity of the product is about 10% to 50% less than that of the polyethylene oxide from which it is made. In other words, the sheared polyethylene oxide can have a viscosity between $9/10$ and $1/2$ of the viscosity of its parent polyethylene oxide.

For higher molecular weight grades of polyethylene oxide, greater shearing forces must be applied. In a general way, sufficient shearing force must be applied that their viscosity is reduced by about 50% to more than 99%. In other words, such sheared polyethylene oxide has a viscosity between about $1/2$ and less than $1/100$ of the viscosity of the polyethylene oxide from which it is made.

Sheared polyethylene oxide may be used in beer in the same manner and in the same concentrations as already described for unmodified polyethylene oxide. While the polymer may be added during fermentation, we prefer to add it after the completion of fermentation, to avoid loss of material by adsorption or absorption by the yeast or other solid material.

The example given previously and the following examples illustrate the use of sheared polyethylene oxide in fermented malt beverages such as beer, but in no way limit the invention.

There is yet another surprising advantage of sheared polyethylene oxide in beer.

In the case of normal polyethylene oxide, in a very general way the higher the molecular weight (and viscosity) of the grade used, the greater is its effect on foam life.

One might expect, therefore, that reducing viscosity by shearing action would have an adverse effect on the polymers' action on beer foam life. Such is not, however, the case. Very large reductions in viscosity may be brought about by shearing action with little, if any, effect on behavior toward beer.

Thus, for example, the same effect on beer foam life was noted using sheared polyethylene oxide with a 1% viscosity of 32 centipoises as with a viscosity of 3200 centipoises for the unsheared material in the same concentration.

The example given previously and the following examples illustrate the use of sheared polyethylene oxide in beer, but in no way limit the invention.

*Example II*

Polyethylene oxide having a viscosity in 1% aqueous solution of 6000 centipoises was used.

A 1% solution of sheared polyethylene oxide was prepared by adding this polyethylene oxide to water, allowing it to soak a few hours to become thoroughly wet, and then subjecting it to the shearing action of a Waring Blendor at 15,000 r.p.m. for 30 seconds. The resultant solution had a viscosity of 650 centipoises.

This solution was added to a finished beer. The final concentration of the polymer was 80 p.p.m. This beer had a foam collapse time of 7 minutes and 1 second. The same beer under identical conditions but without the addition of polyethylene oxide had a collapse time of 5 minutes and 22 seconds.

*Example III*

The same polyethylene oxide was used as in Example II, but shearing at 15,000 r.p.m. was continued for 5 minutes. The resultant 1% solution of sheared polyethylene oxide had a viscosity of 80 centipoises.

This solution was added to the same finished beer used in Example II. The final concentration of the polymer was 80 p.p.m. This beer had a foam collapse time of 7 minutes and 21 seconds. The same beer under identical conditions but without the addition of polyethylene oxide had a collapse time of 5 minutes and 22 seconds.

*Example IV*

A 1% solution of polyethylene oxide was prepared by stirring at 500 r.p.m. (see Example I). Its viscosity was 3200 centipoises. This solution was passed through a colloid homogenizer with a pressure at the orifice of about 1000 pounds. The viscosity of the sheared polyethylene oxide solution was 500 centipoises.

This solution was added to a finished beer. The final concentration of the polymer was 120 p.p.m. This beer had a foam collapse time of 7 minutes and 6 seconds. The same beer under identical conditions but without the addition of polyethylene oxide had a collapse time of 5 minutes and 25 seconds.

We claim:

1. The method of improving the character and life of foam producing carbonated fermented malt beverages which comprises dissolving therein sheared high molecular weight ethylene oxide polymerizate.

2. The method of enhancing and prolonging the life of foam produced by beer which comprises dissolving sheared high molecular weight ethylene oxide polymerizate in the beer.

3. A normally foam producing carbonated fermented malt beverage, said beverage containing in solution sheared high molecular weight ethylene oxide polymerizate.

4. Beer containing in solution sheared high molecular weight ethylene oxide polymerizate.

No references cited.